United States Patent
Biskeborn (10) Patent No.: US 9,734,849 B2
(45) Date of Patent: Aug. 15, 2017

(54) DIRECTION DEPENDENT TAPE HEAD ASSEMBLY TO REDUCE TAPE-HEAD FRICTION

(71) Applicant: INTERNATIONAL BUSINESS MACHINES CORPORATION, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/231,653

(22) Filed: Aug. 8, 2016

(65) Prior Publication Data
US 2017/0169841 A1    Jun. 15, 2017

Related U.S. Application Data

(62) Division of application No. 14/966,426, filed on Dec. 11, 2015, now Pat. No. 9,449,619.

(51) Int. Cl.
*G11B 5/187* (2006.01)
*G11B 5/48* (2006.01)
*G11B 5/60* (2006.01)
*G11B 15/64* (2006.01)

(52) U.S. Cl.
CPC .......... *G11B 5/1871* (2013.01); *G11B 5/4893* (2013.01); *G11B 5/60* (2013.01); *G11B 15/64* (2013.01)

(58) Field of Classification Search
CPC ......... G11B 5/02; G11B 5/187–5/1874; G11B 5/4983; G11B 5/60; G11B 15/62–15/64; G11B 21/20–21/21

USPC ..... 360/31, 53, 55, 61–64, 69, 75, 221, 231, 360/241.1, 313–317, 121
See application file for complete search history.

(56) References Cited

U.S. PATENT DOCUMENTS

| | | |
|---|---|---|
| 7,342,738 B1 | 3/2008 | Anderson et al. |
| 7,414,811 B2 | 8/2008 | Biskeborn |
| 8,184,394 B2 | 5/2012 | Poorman et al. |
| 8,233,246 B2 | 7/2012 | Koeppe |
| 8,254,058 B2 | 8/2012 | Biskeborn |
| 8,373,944 B2 | 2/2013 | Biskeborn |

(Continued)

OTHER PUBLICATIONS

IBM, List of IBM Patents or Patent Applications Treated as Related, Appendix P, dated Aug. 9, 2016, 2 pages.

(Continued)

*Primary Examiner* — Wayne Young
*Assistant Examiner* — James L Habermehl
(74) *Attorney, Agent, or Firm* — David Zwick (57) ABSTRACT

A tape appliance that includes two outer write heads and an inner read head arranged along a magnetic tape path in WRW order, each write head tape bearing surface angled downward towards the inner read head. The heads are configured such that for a first direction of tape travel, the tape engages the tape bearing surface of a first write head followed by engaging the tape bearing surface of the read head and flies over the tape bearing surface of the other write head. For the reverse direction of tape travel, the tape engages the tape bearing surface of the other write head followed by engaging the tape bearing surface of the write head and flies over the tape bearing surface of the first write head.

4 Claims, 6 Drawing Sheets (56) References Cited

U.S. PATENT DOCUMENTS

| | | |
|---|---|---|
| 8,493,682 B2 | 7/2013 | Bui et al. |
| 8,767,336 B2 | 7/2014 | Bui et al. |
| 8,797,682 B1 | 8/2014 | Biskeborn et al. |
| 8,797,687 B1 | 8/2014 | Biskeborn et al. |
| 8,861,132 B2 | 10/2014 | Biskeborn et al. |
| 8,964,319 B1 | 2/2015 | Biskeborn et al. |
| 8,982,495 B2 | 3/2015 | Biskeborn et al. |
| 9,001,462 B2 | 4/2015 | Biskeborn et al. |
| 9,230,590 B1 | 1/2016 | Biskeborn et al. |
| 9,299,368 B2 * | 3/2016 | Biskeborn ............... G11B 5/60 |
| 2016/0232936 A1 * | 8/2016 | Poorman ............... G11B 15/62 |

OTHER PUBLICATIONS

Pending U.S. Appl. No. 14/966,426, filed Dec. 11, 2015, Entitled: "Direction Dependent Tape Head Assembly to Reduce Tape-Head Friction".

* cited by examiner

DIRECTION DEPENDENT TAPE HEAD ASSEMBLY TO REDUCE TAPE-HEAD FRICTION

BACKGROUND

The present invention relates generally to the field of magnetic information storage and retrieval, and more particularly to a direction dependent tape head assembly configured to control fly over and skiving based on tape direction.

The amount of data for which backup and retention is required continues to increase. As a result, market demand for higher tape appliance data rates and greater areal density of the tape medium remains high. A current approach addresses this demand through higher density recording by increasing the active channels per tape head, for example, 32, 64, or more active heads. To maintain the quality and integrity of the recorded data as the number of active heads increases, tape head spacing is reduced by, for example, using a smoother tape medium. However, as tape head spacing is reduced, static and running friction between the tape medium and the head surfaces increases, resulting in accelerated wear of the active head surfaces and accelerated buildup of debris on the active surfaces.

Static friction, also known as "stiction," at the head-tape interface of a tape drive can be a significant issue. The stiction forces for smooth tapes can be sufficiently high such that the longitudinal force needed to free the tape medium from the head may result in damage to the tape. One solution for reducing static friction is by using tape lifters to lift the tape off the heads when tape is not moving. However, this approach increases the cost and complexity of the tape drive assemblies. Another approach is to angle one or more head surfaces such that a tensioned tape will pop off the head surface as the tape comes to rest. However, with conventional integrated head assemblies, such as integrated RWR or WRW head assemblies, it typically is not possible to appropriately angle all the head surfaces due to the small separation between the read transducer array(s) and the write transducer array(s).

A solution for reducing running friction in conventional integrated head assemblies is beveling portions of the edges of the tape bearing surfaces of the tape head modules. This tends to reduce friction by increasing the amount of air entrained by the tape, as well as by not requiring the tape to wrap a skiving edge of the tape bearing surface edges. However, debris tends to accumulate on the beveled portions, and, for conventional head assemblies, portions of the tape head surfaces remain unbeveled, which continue to contribute to friction and are subject to wear for both tape motion directions.

BRIEF SUMMARY

Embodiments of the present invention disclose a tape appliance that includes two read heads and two write heads arranged along a magnetic tape path. Each head includes a tape bearing surface bounded by two edges across the tape path. Each read head includes a read transducer array in its tape bearing surface across a portion of the tape path and intermediate the two edges, and each write head includes a write transducer array in its tape bearing surface across a portion of the tape path and intermediate the two edges. The heads are configured such that for a first longitudinal direction of tape travel along the tape path, the tape engages the tape bearing surface of a first one of the write heads followed by engaging the tape bearing surface of a first one of the read heads and flies over the tape bearing surfaces of the other write head and the other read head. For the reverse longitudinal direction of tape travel along the tape path, the tape engages the tape bearing surface of the other write head followed by engaging the tape bearing surface of the other read head and flies over the tape bearing surfaces of the first write head and the first read head. When the tape engages the tape bearing surface of one of the read or write heads, read or write operations, respectively, may be performed on the tape by the read or write transducer arrays of the heads.

Other embodiments of the present invention disclose a tape appliance that includes two read heads and a write head arranged along a magnetic tape path in WRW order. Each head including a tape bearing surface bounded by two edges across the tape path. The read head includes a read transducer array in its tape bearing surface across a portion of the tape path and intermediate the two edges. Each write head includes a write transducer array in its tape bearing surface across a portion of the tape path and intermediate the two edges. The heads are configured such that for a first longitudinal direction of tape travel along the tape path, the tape engages the tape bearing surface of a first one of the write heads followed by engaging the tape bearing surface of the read head and flies over the tape bearing surface of the other write head. For the reverse longitudinal direction of tape travel along the tape path, the tape engages the tape bearing surface of the other write head followed by engaging the tape bearing surface of the read head and flies over the tape bearing surface of the first write head. When the tape engages the tape bearing surface of a read or write head, read or write operations, respectively, may be performed on the tape by the read or write transducer arrays of the heads.

Other embodiments of the present invention disclose a tape appliance that includes two read heads and a write head arranged along a magnetic tape path in RWR order. Each head including a tape bearing surface bounded by two edges across the tape path. The write head includes a write transducer array in its tape bearing surface across a portion of the tape path and intermediate the two edges. Each read head includes a read transducer array in its tape bearing surface across a portion of the tape path and intermediate the two edges. The heads are configured such that for a first longitudinal direction of tape travel along the tape path, the tape engages the tape bearing surface of a first one of the read heads followed by engaging the tape bearing surface of the write head and flies over the tape bearing surface of the other read head. For the reverse longitudinal direction of tape travel along the tape path, the tape engages the tape bearing surface of the other read head followed by engaging the tape bearing surface of the write head and flies over the tape bearing surface of the first read head. When the tape engages the tape bearing surface of a read or write head, read or write operations, respectively, may be performed on the tape by the read or write transducer arrays of the heads.

DETAILED DESCRIPTION

The present invention is directed to tape appliances that include head assemblies with multiple tape bearing surfaces configured to reduce friction and wear at the surfaces by limiting contact between the head surfaces and the tape. This is accomplished by angling the head surfaces to control tape flyover and contact at the surfaces, and by implementing the read and write heads on separate single-rail head assemblies such that the desired surface angles may be realized. In an exemplary embodiment, two head actuator assemblies each include a write head and a read head. The four heads are arranged such that for either direction of longitudinal tape movement, read verification after write may be performed. The head surfaces are angled such that, for tape movement in either direction at production read/write speeds, a write head and a read head pair contact the tape, and the tape flies over the other write head and a read head pair. When the tape is stopped, the head surfaces are angled such that the tape lifts off the head surfaces, thus reducing stiction.

In another embodiment, three head actuator assemblies are used, each including a single read or write head. In one aspect, the heads are arranged in WRW order. In another aspect, the heads are arranged in RWR order. As in the previous embodiment, the heads are angled such that, for tape movement in either direction at production read/write speeds, a write head followed by a read head contact the tape, and the tape flies over the other read or write head. When the tape is stopped, the head surfaces are angled such that the tape substantially lifts off the head surfaces of the outer head actuator assemblies, thus reducing stiction.

Advantages of these arrangements include greater effectiveness over conventional tape head configurations for reducing friction and wear at certain head surfaces.

Figure 1A:
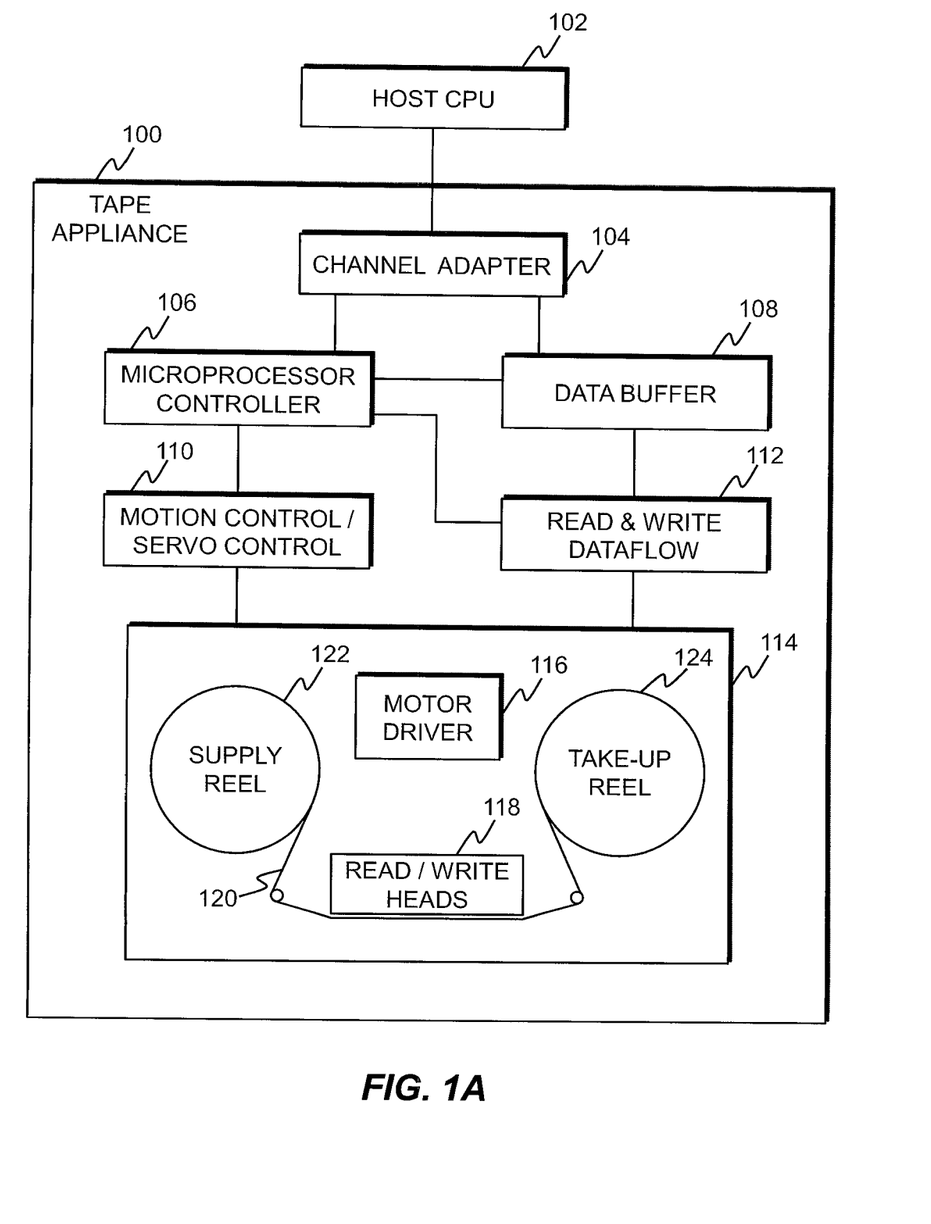
FIG. 1A is a functional block diagram of a tape appliance 100, in accordance with an embodiment of the invention.

FIG. 1A is a functional block diagram of a tape appliance 100, in accordance with an embodiment of the invention. In an exemplary embodiment, tape appliance 100 may be a tape drive. Tape appliance 100 may include several components providing a control and data transfer system for reading and writing data from a host CPU 102, an embodiment of which is described below in relation to FIG. 4, on a magnetic tape medium. By way of example only, those components may include a channel adapter 104, a computer, such as microprocessor controller 106, a data buffer 108, a read/write data flow circuit 112, a motion control system 110, and a tape interface system 114 that includes a motor driver circuit 116 and read/write heads 118.

Microprocessor controller 106 may provide overall control functionality for the operations of all other components of tape appliance 100. The functions performed by microprocessor controller 106 may be programmable via microcode routines according to desired tape drive operational characteristics. During data write operations (with all dataflow being reversed for data read operations), microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuitry 112, which formats the device data into physically formatted data that may be recorded on a magnetic tape medium. Read/write dataflow circuitry 112 is responsible for executing all read/write data transfer operations under the control of microprocessor controller 106. Formatted physical data from read/write circuitry 112 is communicated to tape interface system 114. The latter includes read/write modules in read/write head unit 118, as described in more detail below, and drive motor components (not shown) for performing forward and reverse movement of a tape medium 120 mounted on a supply reel 122 and a take-up reel 124. The drive components of tape interface system 114 are controlled by motion control system 110 and motor driver circuit 116 to execute such tape movements as forward and reverse recording and playback, rewind and other tape motion functions. In addition, motion control system 110 transversely positions read/write heads 118 relative to the direction of longitudinal tape movement in order to record data in a plurality of tracks, and may control other aspects of head positioning, such as those required for skew and/or track following.

Figure 1B:
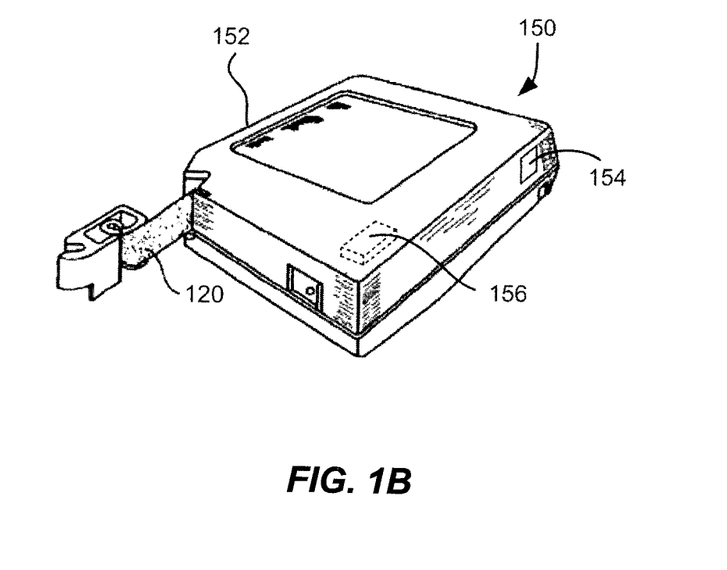
FIG. 1B illustrates an exemplary tape cartridge, in accordance with an embodiment of the invention.

FIG. 1B illustrates an exemplary tape cartridge 150 according to an embodiment of the invention. Tape cartridge 150 may be used with a system such as tape appliance 100 shown in FIG. 1A. As shown, tape cartridge 150 includes a housing 152, a tape 120 in the housing 152, and may include a nonvolatile memory 156 coupled to the housing 152. In some embodiments, the nonvolatile memory 156 may be embedded inside the housing 152. In other embodiments, the nonvolatile memory 156 may be attached to the inside or outside of the housing 152 without modification of the housing 152. For example, the nonvolatile memory may be embedded in a self-adhesive label 154. In one embodiment, the nonvolatile memory 156 may be a flash memory device, ROM device, etc., embedded into or coupled to the inside or outside of the tape cartridge 150. The nonvolatile memory may be accessible by tape appliance 100, and the tape operating software (the driver software) residing on host CPU 102. In an exemplary embodiment, tape cartridge 152 meets the standards specifications of one or more of the Linear Tape Open (LTO) generations, such as LTO-6. All trademarks used herein are the property of their respective owners. In such an embodiment, supply reel 118 may be integral to the LTO tape cartridge, and the end of tape 120 includes a leader pin (not shown) which is mechanically grasped by features (not shown) of tape interface system 114 and threaded onto take-up reel 124.

Figure 2A:
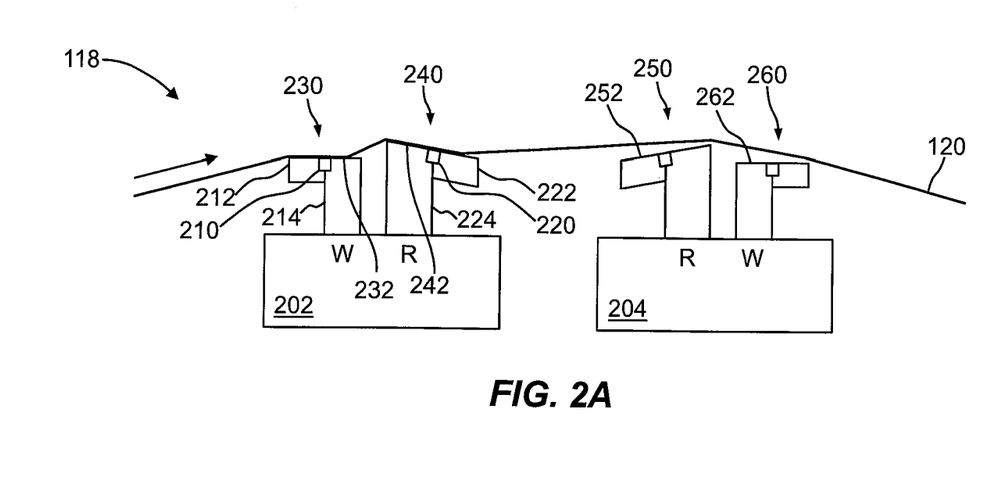
FIGS. 2A and 2B illustrate side views of a read/write head assembly, in accordance with embodiments of the invention.
Figure 2B:
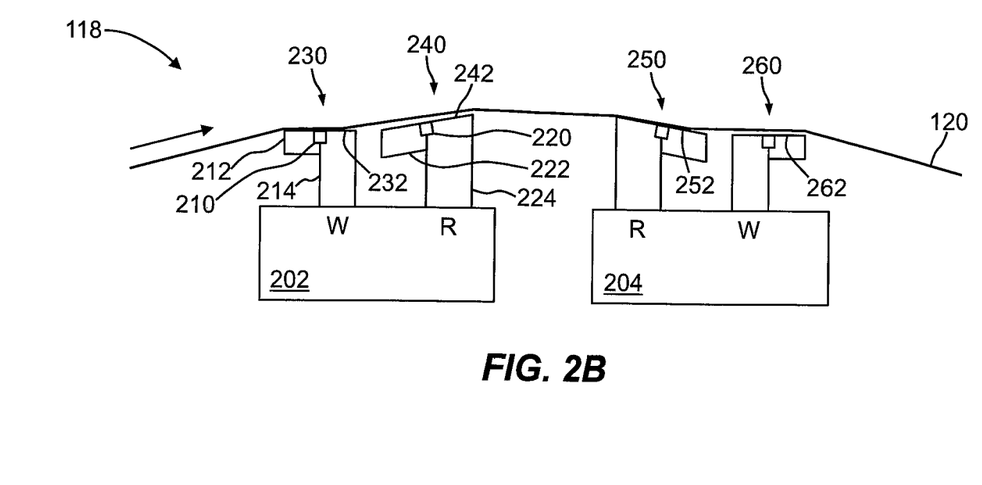

FIGS. 2A and 2B illustrate side views of read/write head 118, in accordance with two exemplary embodiments of the invention. In each exemplary embodiment, read/write head 118 includes a first head actuator assembly 202, which includes a write head 230 and a read head 240, and a second head actuator assembly 204, which includes a read head 250 and a write head 260. For ease of explanation, wrap angles of the read and write heads as illustrated in the Figures may be exaggerated.

Write heads 230 and 260 include modules 214, closures 212, and write transducer arrays 210, described in more detail below with respect to FIG. 4, disposed between modules 214 and closures 212. Modules 214, closures 212, and write transducer arrays 210 are configured to form tape bearing surfaces 232 such that when tape bearing surfaces 232 engage tape 120, write transducer arrays 210 are configured to write data onto tape 120. In various embodiments, tape bearing surfaces 232, as well as tape bearing surfaces 242, 252, and 262, described in more detail below, may be flat lapped, contoured, beveled, or formed of more complex and/or compound surfaces, in accordance with design considerations for various embodiments of the invention.

Read heads 240 and 250 include modules 224, closures 222, and read transducer arrays 220, described in more detail below with respect to FIG. 4, disposed between modules 224 and closures 222. As with write heads 230 and 260, modules 224, closures 222, and write transducer arrays 220 are configured to form tape bearing surfaces 252 such that when tape bearing surfaces 252 engage tape 120, read transducer arrays 220 are configured to read data from tape 120.

Note that while the term "tape bearing surface" appears to imply that the surface facing tape 120 is in physical contact with the tape, this is not necessarily the case. Rather, only a portion of the tape may be in contact with the tape bearing surface, constantly or intermittently, with other portions of the tape "flying" above the tape bearing surface on a layer of air, usually referred to as an "air bearing." Further, the term "engage," as in "tape bearing surfaces 252 engage tape 120," is defined to mean that tape 120 is sufficiently close to a read or write transducer array during longitudinal tape movement that data can be read from or written onto the tape by the transducer arrays in accordance to a desired level of data quality. In practice, when tape 120 engages a tape bearing surface, portions of the tape bearing surface may be in intermittent or constant physical contact with the tape, while other portions of the tape bearing surface may be separated from the tape by an air bearing.

By way of explanation, in the embodiments illustrated in FIGS. 2A and 2B, tape 120 is indicated as having a direction of longitudinal travel across head actuator module 202, then across head actuator module 204, or left to right as illustrated. In this arrangement, head actuator module 202 may be referred to as the "leading" module, and head actuator module 204 may be referred to as the "trailing" module. Similarly, the edges of tape bearing surfaces 232, 242, 252, and 262 encountered first by tape 120 may be referred to as leading edges, and the edges last encountered by tape 120 may be referred to as trailing edges.

The leading edges of tape bearing surfaces 232, 242, 252, and 262 may also serve as "skiving" edges, depending on the geometry of the leading edge, the geometry at which tape 120 encounters the leading edge, the tape tension, and other factors, such as the smoothness and bending stiffness of tape 120. If the leading edge is sharp enough, in conjunction with a sufficient negative wrap angle and tape tension, the skiving edges serve to "shear" air from the underside of tape 120 to prevent air from being drawn into the head-tape gap by the tape, so that atmospheric pressure may push the tape into engagement with the tape bearing surface, i.e., with a small tape fly height, over the longitudinal dimension, with respect to tape direction, of the tape bearing surfaces.

In the exemplary embodiments of FIGS. 2A and 2B, tape bearing surfaces 232, 242, 252, and 262 are configured such that the wrap angles at their leading and trailing edges allow for a write head followed by a read head, in both tape travel directions, to engage tape 120.

With respect to the embodiment illustrated in FIG. 2A, with the direction of travel of tape 120 as indicated, tape 120 first encounters the leading skiving edge of tape bearing surface 232 of write head 230, followed by the leading skiving edge of tape bearing surface 242 of read head 240. The geometry of the wrap angles of tape bearing surfaces 232 and 242 are such that tape 120 engages the tape bearing surfaces, and, for example, write operations with read verify may be performed on tape 120.

In the indicated direct of travel of tape 120, the leading edges of tape bearing surface 252 of read head 250, and tape bearing surface 262 of write head 260 are not skiving edges, and are configured with a wrap angle such that tape 120 flies over these surfaces without contact when tape 120 is moving at production read/write speeds.

With the direction of travel of tape 120 in the reverse direction, the same concepts apply. In this embodiment, with the active write head 230 and the active read head 240 both on the same head actuator assembly 202, skew following may be required for accurate read verification after write.

With respect to the embodiment illustrated in FIG. 2B, with the direction of travel of tape 120 as indicated, tape 120 first encounters the leading skiving edge of tape bearing surface 232 of write head 230, followed by the leading non-skiving leading edge of tape bearing surface 242 of read head 240. Tape 120 then encounters the leading skiving edge of tape bearing surface 252 of read head 250, followed by the leading non-skiving leading edge of tape bearing surface 262 of write head 260.

In this illustrated embodiment, the geometry of the wrap angles of tape bearing surfaces 232 and 252 are such that tape 120 engages the tape bearing surfaces, and, for example, write operations with read may be performed on tape 120. The leading edges of tape bearing surface 242 of read head 240, and tape bearing surface 262 of write head 260 are not skiving edges, and are configured with a wrap angle such that tape 120 flies over these surfaces without contact when tape 120 is moving at production read/write speeds.

With the direction of travel of tape 120 in the reverse direction, the same concepts apply. In this embodiment, with the active write head 230 and the active read head 250 on different head actuator assemblies 202 and 204, skew following may not be required for accurate read verification after write.

In certain embodiments, the trailing edges of the active heads are unwrapped. In other words, the tape lifts off the tape bearing surfaces of the active heads at a position before the trailing edges of the surfaces. However, because of the tendency of a "crowbar" shape to form at the lift position, with its accompanying higher tape pressure on the tape bearing surface, the lift point should be configured such that the high pressure region does not occur over the read or write transducer arrays. In preferred embodiments, when tape 120 is not moving, the wrap angles of tape bearing surfaces 232, 242, 252, and 262 are such that tape 120 will substantially lift off the surfaces such that the tape may be supported by only a leading or trailing edge (or outer or inner edge) of the surface. This has the advantage of greatly reducing stiction between the tape and the tape bearing surfaces.

In the embodiments illustrated in FIGS. 2A and 2B, tape bearing surfaces 232 and 242 of head actuator assembly 202 and tape bearing surfaces 252 and 262 of head actuator assembly 204 mirror each other. In other embodiments, depending on such factors size, cable routing, cost, temperature, etc, the geometries of head actuator assemblies 202 and 204 may not mirror each other.

In the embodiments illustrated in FIGS. 2A and 2B, the heads are arranged in WRRW order, such that the outer heads 230 and 260 are write heads, and the inner heads 240 and 250 are read heads. In other embodiments, the head functionality can be arranged in RWWR order such that in one direction of tape travel, the tape first engages an active write head followed by an active read head, to allow for read verification after write, and the tape flies over the two inactive heads. In the other direction of tape travel, the other write head-read head pair becomes active, and the tape engages this pair of heads in write-read order, and flies over the now inactive first pair of write-read heads.

In an exemplary embodiment, in which the tape is based on an aramid substrate and a barium ferrite coating, the distance between head actuator assemblies 202 and 204 may be about 50 mm, and the distance between transducer arrays on the same head actuator assembly may be about 0.9 mm. Generally, it is preferable to have the distance between the write and read transducer arrays as small as possible, which enables quick read verification after write. However, practical considerations, such as shielding the read elements from interference from the write elements, may limit how close these arrays can be.

The skiving leading edge wrap angles may be around 0.2-0.3 degrees, and preferable greater than 0.1 degrees. In various embodiments, these dimensions and angles can vary based on factors including the smoothness of the tape and tape bending stiffness, which can affect the position on the tape bearing surface after the skiving edge at which the tape engages the surface, and the position at which the tape lifts off the surface.

Figure 3A:
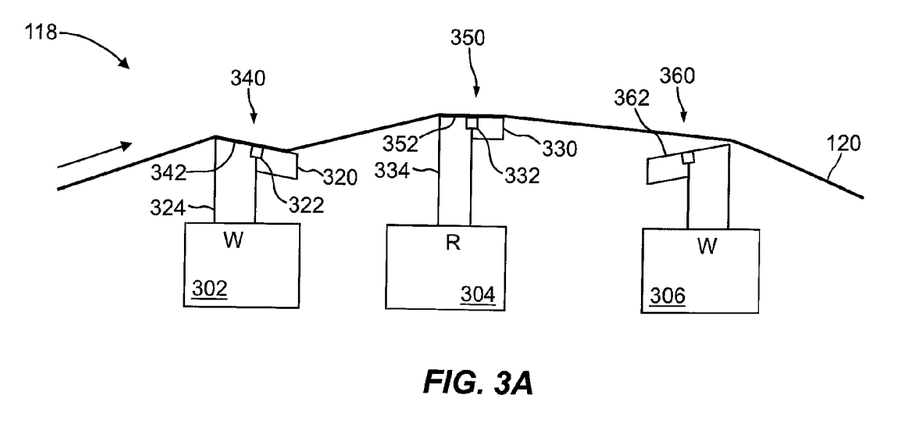
FIGS. 3A and 3B illustrate side views of a read/write head assembly, in accordance with another embodiment of the invention.
Figure 3B:
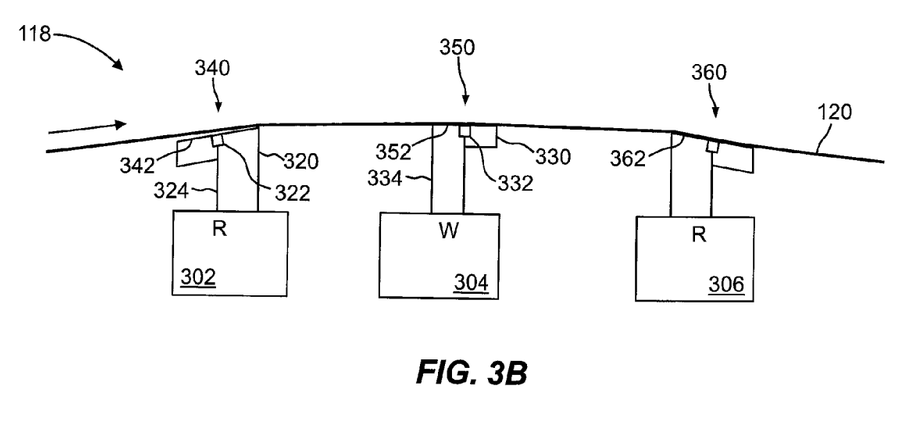

FIGS. 3A and 3B illustrate side views of read/write head 118, in accordance with another pair of exemplary embodiments of the invention. In these embodiments, read/write heads 118 includes head actuator assemblies 302, 304, and 306. In the embodiment of FIG. 3A, head actuator assemblies 302, 304, and 306 are arranged in WRW order. In the embodiment of FIG. 3B, head actuator assemblies 302, 304, and 306 are arranged in RWR order. In both embodiments, for either direction of tape travel, the tape first engages a write head, followed by engaging a read head. This is accomplished by appropriately setting the angles of the leading edges of the tape bearing surfaces of the heads to be either skiving edges or fly over edges.

With respect to the embodiments of both FIGS. 3A and 3B, head actuator assemblies 302 and 306 include write or read heads 340 and 360, respectively, each of which further includes module 324, closures 320, and write or read transducer arrays 322 disposed between modules 324 and closures 320. Modules 324, closures 320, and write or read transducer arrays 322 are configured to form tape bearing surfaces 342 and 362 such that when the tape bearing surfaces engage tape 120, write or read transducer arrays 322 are configured to write data onto or read data from tape 120.

Head actuator assembly 304 includes read or write head 350, which further includes module 334, closures 330, and read or write transducer array 332 disposed between modules 324 and closures 320. Module 334, closure 330, and read transducer array 332 are configured to form tape bearing surface 352 such that when the tape bearing surface engages tape 120, read transducer array 332 is configured to read data from tape 120.

In an exemplary embodiment, in which the tape is based on an aramid substrate and a barium ferrite coating, the distance between tape bearing surfaces 342, 352, and 362 is about 50 mm. The skiving leading edge wrap angles may be around 0.2-0.3 degrees, and preferable greater than 0.1 degrees. Generally, it is preferable to have the distance between the write and read transducer arrays as small as possible, which enables quick read verification after write. In various embodiments, these dimensions and angles can vary based on factors including the smoothness of the tape and tape bending stiffness, which can affect the position on the tape bearing surface after the skiving edge at which the tape engages the surface, and the position at which the tape lifts off the surface.

With respect to the embodiments of both FIGS. 3A and 3B, head actuator assemblies 302, 304, and 306 are configured as independent assemblies, i.e., capable of independent movement with respect to one another, for example, for track following and/or skew following. Further, in a preferred embodiment, each head, including modules 324 and 334, the closures 320 and 330, and transducer arrays 322 and 332, respectively, are configured for one of read or write, and may be constructed in a single-rail configuration. Such a head configuration, in conjunction with the dimensions described above, allows, among other things, the tape bearing surfaces to achieve the desired angles with respect to one another.

With respect to FIG. 3A, in the indicated direct of travel of tape 120, the leading edges of tape bearing surface 342 of write head 340, and tape bearing surface 352 of read head 350 are skiving edges, and are configured with a wrap angle such that tape 120 engages these surfaces when tape 120 is moving at production read/write speeds. The leading edge of tape bearing surface 362 of write head 360 is not a skiving edge, and is configured with a wrap angle such that tape 120 flies over this surface without contact when tape 120 is moving at production read/write speeds.

With the direction of travel of tape 120 in the reverse direction, the same concepts apply. In this embodiment, read head 350 remains active for tape travel in both directions to enable read verification after write. Similar to the embodiments of FIGS. 2A and 2B, the trailing edges of the active heads are unwrapped. In a preferred embodiment, when tape 120 is not moving, the wrap angles of tape bearing surfaces 342 and 362 are such that tape 120 will lift off the surfaces and may be supported by the higher skiving edges, which are the outer edges of tape bearing surfaces 342 and 362, thus reducing stiction.

With respect to FIG. 3B, in the indicated direct of travel of tape 120, the leading edges of tape bearing surface 352 of write head 350, and tape bearing surface 362 of read head 360 are skiving edges, and are configured with a wrap angle such that tape 120 engages these surfaces when tape 120 is moving at production read/write speeds. The leading edge of tape bearing surface 342 of write head 340 is not a skiving edge, and is configured with a wrap angle such that tape 120 flies over this surface without contact when tape 120 is moving at production read/write speeds.

With the direction of travel of tape 120 in the reverse direction, the same concepts apply. In this embodiment, write head 350 remains active for tape travel in both directions to enable read verification after write. Similar to the embodiments of FIGS. 2A and 2B, the trailing edges of the active heads are unwrapped. In a preferred embodiment, when tape 120 is not moving, the wrap angles of tape bearing surfaces 342 and 362 are such that tape 120 will lift off the surfaces and may be supported by the higher skiving edges, which are the inner edges of tape bearing surfaces 342 and 362, thus reducing stiction.

Figure 4:
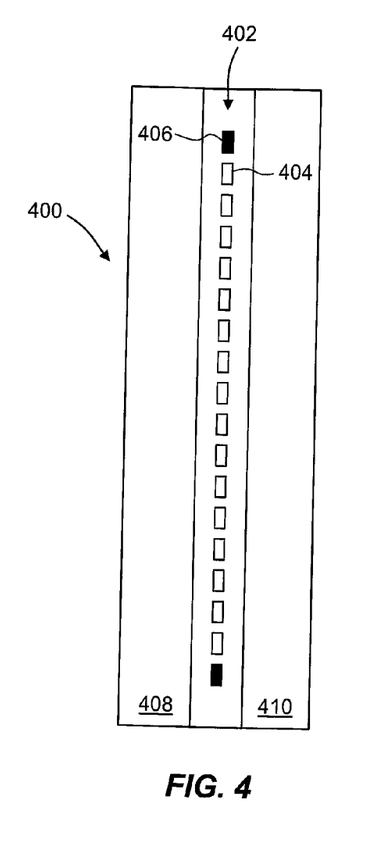
FIG. 4 illustrates an exemplary tape head, in accordance with an embodiment of the invention.

FIG. 4 shows an exemplary tape head 400, from the perspective of a plan view, that may be representative of any of the read or write heads described with respect to the embodiments of FIG. 2A, 2B, 3A, or 3B. Exemplary tape head 400 includes a transducer array 402, which is disposed between a module 408 and a closure 410. Module 408, transducer array 402, and closure 410 are configured to form a tape bearing surface, such as any of the tape bearing surfaces described with respect to the embodiments of FIG. 2A, 2B, 3A, or 3B. Transducer array 400 may have a plurality of read or write transducers 404, depending on the function of the tape head. and one or more servo readers 406.

The number of read or write transducers may vary, depending on the tape technology in use, and may include, for example, 16, 32, 64, 128, etc., transducers. In exemplary embodiments, tape head 400 is directed to either reading or writing.

Several read elements 408 may be present, such as 8, 16, 32, etc. The transducer elements 402 as shown are linearly aligned in a direction generally perpendicular to the direction of tape travel. However, the transducer elements 402 may also be aligned diagonally, etc. Servo readers 406 are generally positioned on the outside of the one or more transducer elements 402. In embodiments of the invention, transducer array 400 may be optimized for a specific generation of a tape medium, such as LTO-7.

Figure 5:
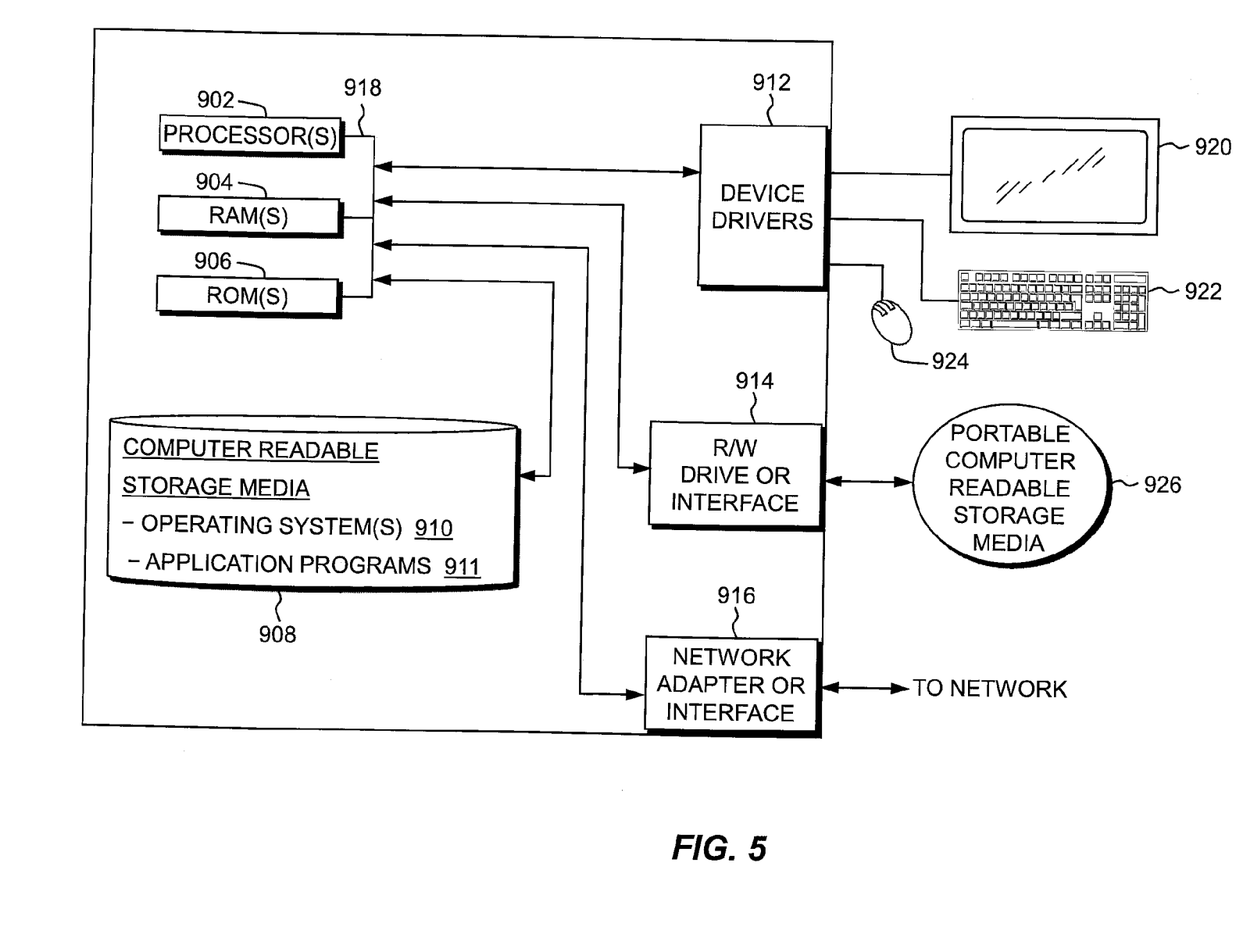
FIG. 5 depicts a block diagram of components of the host CPU of FIG. 1, in accordance with an embodiment of the present invention.

FIG. 5 illustrates a block diagram of components of host CPU 102 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Host CPU 102 may include one or more processors 902, one or more computer-readable RAMs 904, one or more computer-readable ROMs 906, one or more computer-readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host CPU 102 may also include a R/W drive or interface 914 to read from and write to one or more portable computer readable storage media 926. Application programs 911 on host CPU 102 may be stored on one or more of the portable computer readable storage media 926, read via the respective R/W drive or interface 914 and loaded into the respective computer readable storage media 908.

Host CPU 102 may also include a network adapter or interface 916, such as a TCP/IP adapter card or wireless communication adapter (such as a 4G wireless communication adapter using OFDMA technology). Application programs 911 on computing device 106 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Host CPU 102 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A tape appliance, comprising:
two outer write heads and an inner read head arranged along a magnetic tape path in WRW order, each head including a tape bearing surface bounded by two edges across the tape path, the read head including a read transducer array in its tape bearing surface across a portion of the tape path and intermediate the two edges, and each write head including a write transducer array in its tape bearing surface across a portion of the tape path and intermediate the two edges;
each write head configured such that its tape bearing surface is angled downward towards the inner read head;
the heads configured such that for a first longitudinal direction of tape travel along the tape path, a tape engages the tape bearing surface of a first one of the write heads followed by engaging the tape bearing surface of the read head and flies over the tape bearing surface of the other write head, and for the reverse longitudinal direction of tape travel along the tape path, the tape engages the tape bearing surface of the other write head followed by engaging the tape bearing surface of the read head and flies over the tape bearing surface of the first write head;
wherein when the tape engages the tape bearing surface of a read or write head, read or write operations, respectively, may be performed on the tape by the read or write transducer arrays of the heads.

2. A tape appliance in accordance with claim 1, wherein when the tape is at rest along the tape path, the tape substantially lifts off the tape bearing surfaces of the outer write heads such that contact between the tape and the write heads occurs at only an outer edge of each of the tape bearing surfaces.

3. A tape appliance in accordance with claim 1, wherein the first edge of each tape bearing surface encountered by the tape in a longitudinal direction of tape travel along the tape path is the leading edge, and the second edge of each tape bearing surface encountered by the tape in a longitudinal direction of tape travel along the tape path is the trailing edge, and the heads are further configured such that:
when the tape engages the tape bearing surface of a write head, the tape lift off position on the tape bearing surface is before the trailing edge of the tape bearing surface and after the transducer array in the tape bearing surface.

4. A tape appliance in accordance with claim 1, wherein the first edge of each tape bearing surface encountered by the tape in a longitudinal direction of tape travel along the tape path is the leading edge, and the second edge of each tape bearing surface encountered by the tape in a longitudinal direction of tape travel along the tape path is the trailing edge:
  wherein the heads are configured to cause the tape to engage their tape bearing surfaces by configuring their leading edges to be skiving edges.

* * * * *